F. AYLER.
VEHICLE BRAKE.
APPLICATION FILED MAR. 26, 1918.

1,289,078.

Patented Dec. 31, 1918.
2 SHEETS—SHEET 1.

Inventor
F. Ayler
By Lacey & Lacey
Attorney

F. AYLER.
VEHICLE BRAKE.
APPLICATION FILED MAR. 26, 1918.
1,289,078.
Patented Dec. 31, 1918.
2 SHEETS—SHEET 2.
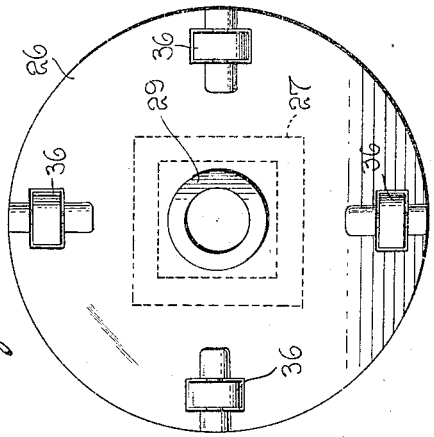
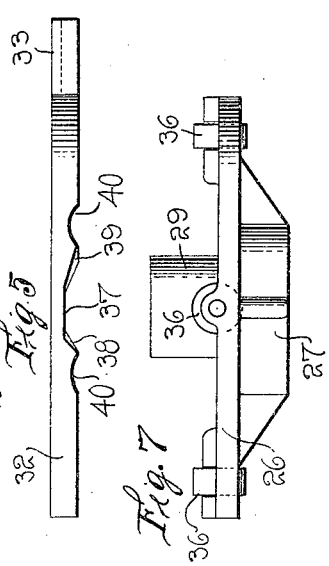
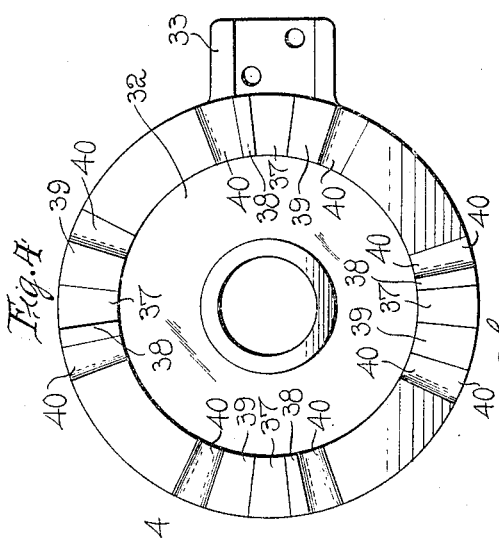
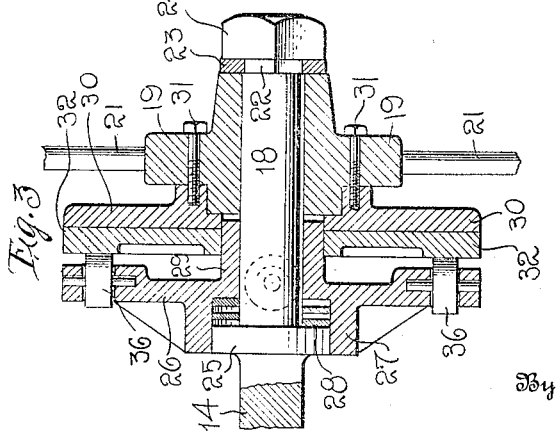
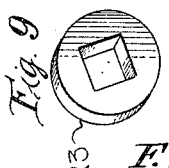
Inventor
F. Ayler
By Lacey & Lacey
Attorney

UNITED STATES PATENT OFFICE.

FRANK AYLER, OF WASHTUCNA, WASHINGTON.

VEHICLE-BRAKE.

1,289,078.  Specification of Letters Patent.  Patented Dec. 31, 1918.

Application filed March 26, 1918. Serial No. 224,884.

*To all whom it may concern:*

Be it known that I, FRANK AYLER, a citizen of the United States, residing at Washtucna, in the county of Adams and State of Washington, have invented certain new and useful Improvements in Vehicle-Brakes, of which the following is a specification.

This invention relates to vehicle brakes, more particularly to brakes employed in connection with hand actuated vehicles, such as the baggage and express trucks employed at railway stations and the like, and has for one of its objects to provide a brake device which is held in inoperative position when the draft tongue or pulling handle is maintained in operative position, and which will be automatically applied when the pulling handle or tongue is disposed in its lower position, with its outer end in contact with the floor or ground, or elevated into an abnormally high position. Thus while the operator is moving the truck over the ground under normal conditions the brake will be held in unapplied or inoperative position, but when the movement of the vehicle is stopped and the operator drops the handle to the ground, the brake will be automatically applied. If on the other hand the operator desires to apply the brake without releasing his grip upon the handle, he simply elevates the latter into an abnormal position.

Another object of the invention is to provide an apparatus of this character in which provision is made for holding the pull tongue in locked position when the brake is applied.

The improved device may be applied to various forms of vehicles, but as before stated, is more particularly applicable to the freight or baggage trucks employed by railway companies, express and transportation companies, and the like, and for the purpose of illustration the improved device is shown applied to a hand operated freight truck, and in the drawings:

Fig. 3 is an enlarged sectional view on the line 3—3 of Fig. 1.

Fig. 4 is a side view of the intermediate friction disk.

Fig. 5 is a plan view of the member shown in Fig. 4.

Fig. 6 is a side view of the axle supported disk.

Fig. 7 is a plan view of the disk shown in Fig. 6.

Fig. 8 is a detached perspective view of the pressure applying spring.

Fig. 9 is a detached perspective view of the axle journal washer.

Corresponding and like parts are referred to in the following description and indicated in all the views of the drawings by the same reference characters.

Figures 1, 2:
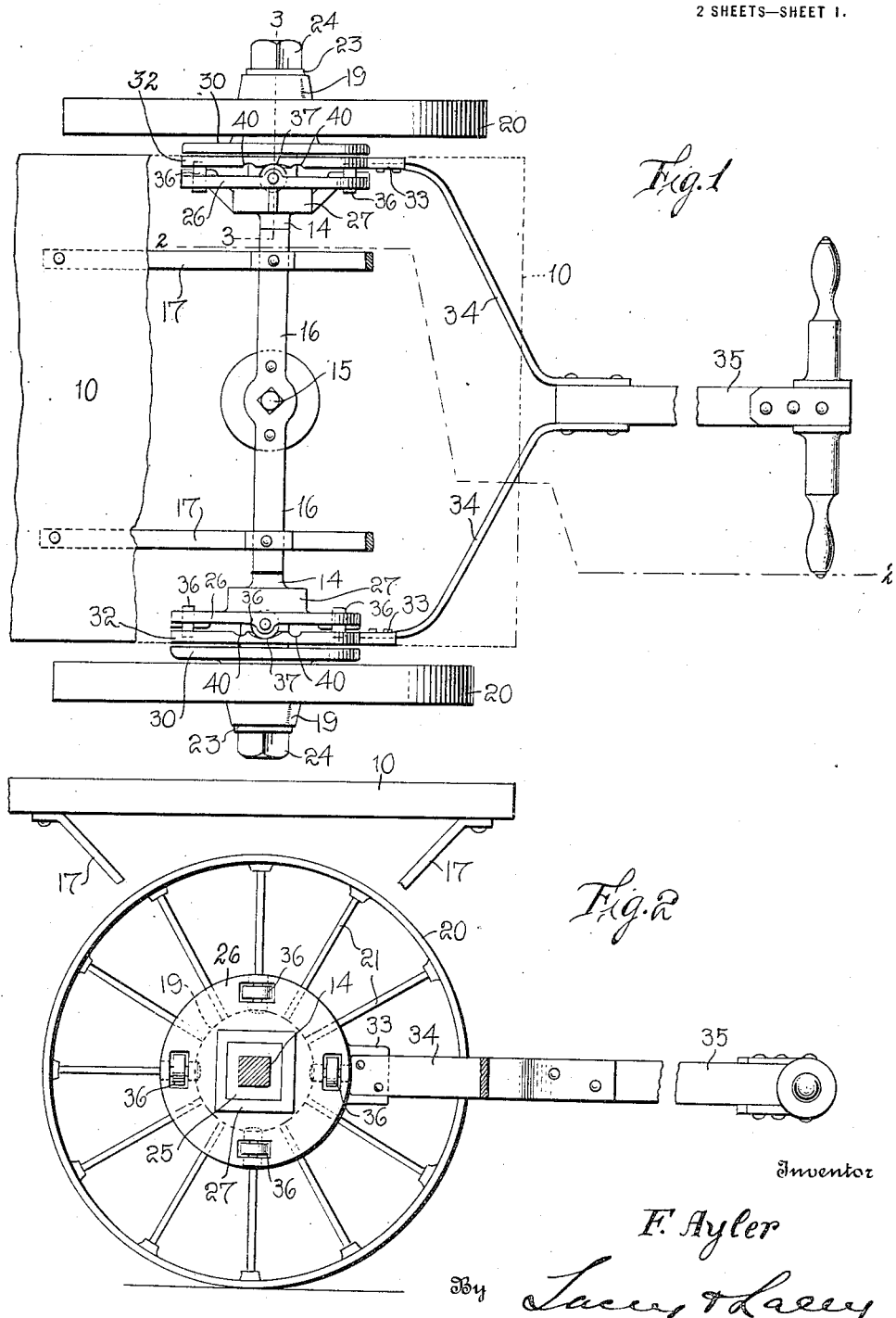
Figure 1 is a plan view of the forward portion of a truck with the improvement applied, a portion of the truck platform being broken away.
Fig. 2 is a side elevation of the parts shown in Fig. 1, with the forward axle in section on the line 2—2 of Fig. 1.

The truck employed for illustrating the operation of the device comprises a platform, a portion of which is shown at 10, a forward axle, represented at 14 and pivotally united at 15 to a bolster device 16, the latter being suitably braced from the platform, as represented at 17. The forward axle is held form turning, and is provided at its ends with journals 18 upon the outer portion of which the hubs 19 of the forward wheels are mounted for rotation. The rims of the forward wheels are represented at 20 and the spokes at 21. One of the journals 18 of the forward axle is represented more fully in Fig. 3, and is formed with a square portion 22 between its threaded terminal and the body of the journal. Fitting upon the square portion 22 of the journal is a washer 23 having a square aperture to fit over the square portion of the journal, the washer thus being held from turning. The holding nut is represented at 24. and bears against the washer.

The axle 14 is provided with a square or otherwise than round stop collar, represented at 25, and engaging the axle in advance of the stop collar is a circular disk or plate 26 having a socket or sleeve 27 extending from one face with its interior square or corresponding to the outer face of the collar 25 and engaging over the same. The member 26 is formed with a central opening to slidably engage the journal 18 of the axle. The member 26 is thus movable longitudinally of the axle but is held from turning thereon by the coaction of the squared collar 25 and the squared interior face of the sleeve or socket 27.

A relatively stiff or strong spring, represented at 28, is preferably disposed in the socket 27 between the body of the disk 26 and the stop collar 25.

Each end of the forward axle is provided with a squared portion 25, journal 18, stop washer 23 and holding nut 24, but only one set is shown for illustration, the ends of the axles being precisely alike except that the parts are arranged rights and lefts.

Extending from the member 26 is a sleeve 29 which is bored to rotatably engage the journal and materially increases the length of the bearing of the member 26, and likewise provides a bearing for other parts of the device.

Connected to each hub 19 is a friction plate, represented as a whole at 30 and rigidly connected as by bolts 31 to the hub.

Mounted for rotation upon each of the bearing sleeves 29 is a friction plate or disk 32 each disk having a projection or socket member 33 to receive the braces or "hound" portions 34 which support the pulling tongue or handle, represented at 35. By this means when the tongue member is moved vertically the member 32 will be correspondingly rotated upon the bearing sleeves 29. Mounted for rotation in the plate 26, preferably near the margin, are bearing rollers 36, and formed in the confronting face of the member 32 are depressions 37 to receive the rollers when the member 32 is disposed in a certain position. The rollers 36 and the depressions 37 will be so disposed that when the tongue 35 is in substantially level position, the rollers will be seated within the depressions 37 and permit the member 32 to move into relatively close proximity to the member 26 and thus be correspondingly moved away from the member 30. When thus disposed the forward wheels are left free to rotate upon the forward axle journals, but when the tongue member is moved either upwardly or downwardly into an abnormal position, for instance with its forward end in contact with the ground or floor, or its outer end elevated above its normal pulling position, the member 32 will be rotated to a sufficient extent to cause the depressions 37 to move past the rollers 36 and cause the latter to engage with the solid portions of the member 32 between the depressions, and thus move the member 32 into engagement with the member 30, and couple the rigid member 26 to the member 30 and operate as a brake to the forward wheels.

By this arrangement so long as the operator is moving the vehicle under normal conditions, or with the pulling tongue substantially in level position, the brake device is held in inoperative position, but if the operator drops the tongue to the floor or ground or elevates the tongue above its normal operative position, the brake will be automatically applied. Thus at the end of the trip the brake is applied by simply releasing the tongue and permitting it to drop, or the brake may be as readily applied at any intermediate point in the trip of the vehicle by simply elevating the tongue.

The ends of the depressions 37 are beveled, as shown more clearly in Fig. 5, one of the beveled ends being relatively short, as shown at 38, and the other beveled end being relatively long, as shown at 39. The shorter beveled ends of the depressions engage with the rollers 36 when the tongue is dropped to the floor, and thus quickly applies the brake, while the longer beveled ends 39 engage the rollers 36 when the tongue is elevated to enable the brake to be gradually applied. Thus when running down grade it may be desirable to simply check the progress of the car and apply the brake only to a limited extent, and this can be done, as will be obvious by moving the handle slowly into its upper or abnormal position. The force of the friction exerted by the brake device may thus be readily controlled by simply operating the pulling tongue vertically.

Formed in the face of the member 32 at each side of the depressions 37 are other depressions or sockets 40 into which the rollers 36 are received to hold the tongue when the brake is applied. The sockets 40 will be of sufficient depth and the spring 28 will possess sufficient strength to hold the tongue in elevated position against its own gravity, and also to hold the tongue in depressed position against normal strains, but will permit the tongue to be either elevated or depressed if abnormal strain is applied. Thus the tongue is automatically locked in both elevated and depressed position, or when the brake is applied.

The improved device is simple in construction, can be inexpensively manufactured and applied without material structural change in the truck, and a very slight change in the construction of the forward axle.

Having thus described the invention, what is claimed as new is:

1. In a vehicle, an axle held from rotation and including a journal adapted to support a bearing wheel and having a stop collar of other form than round, an inner member having an inwardly directed sleeve with its interior corresponding to and engaging over the stop collar and coupled thereby to the axle, and an inner sleeve conforming to and engaging over the journal, an outer member adapted to be connected to rotate with the wheel, an intermediate member rotative upon the inner sleeve, a pulling member carried by the intermediate member, and means whereby the outer and inner members are coupled to the intermediate member when the pulling member is moved into an abnormal position.

2. In a vehicle, an axle including a journal adapted to support a bearing wheel and having a stop collar of other form than round, an inner member having an outer sleeve to receive the stop collar and coupled thereby to the axle, and an inner sleeve engaging over the journal, a spring between the stop collar and the inner member, an outer member connected to rotate with the wheel, an intermediate member rotative upon the inner sleeve, and means whereby the outer and inner members are coupled to the intermediate member when the pulling member is moved into abnormal position.

3. In a vehicle including an axle and a bearing wheel rotative thereon, an outer member fast to the wheel and having a friction element, an inner member fast to the axle and having an outwardly directed sleeve, an intermediate member rotative and having a friction element coacting with the friction element of the outer member, said inner and intermediate members having coacting rollers and depressions and locking seats for the rollers adjacent to the depression, a pulling member carried by the intermediate friction member, said rollers being so located as to enter the depressions when the pulling member is disposed in normal or operative position and to engage the seat portions when the pulling member is disposed in an abnormal or inoperative position, to cause the intermediate member to be engaged with the outer friction member and the parts locked in adjusted position.

In testimony whereof I affix my signature.

FRANK AYLER.

Copies of this patent may be obtained for five cents each, by addressing the "Commissioner of Patents, Washington, D. C."